United States Patent [19]

Mollenauer

[11] Patent Number: 5,058,974
[45] Date of Patent: Oct. 22, 1991

[54] DISTRIBUTED AMPLIFICATION FOR LIGHTWAVE TRANSMISSION SYSTEM

[75] Inventor: Linn F. Mollenauer, Colts Neck, N.J.

[73] Assignee: AT&T Bell Laboratories, Murray Hill, N.J.

[21] Appl. No.: 418,000

[22] Filed: Oct. 6, 1989

[51] Int. Cl.⁵ .......................... G02B 6/26; G02B 6/42
[52] U.S. Cl. ........................................ 385/27; 372/6; 359/341; 385/24
[58] Field of Search ............... 350/96.15, 96.16, 96.20, 350/96.21; 372/6

[56] References Cited

U.S. PATENT DOCUMENTS

| | | | |
|---|---|---|---|
| 4,546,476 | 10/1985 | Shaw et al. | 372/6 |
| 4,699,452 | 10/1987 | Mollenauer | 350/96.16 |
| 4,787,927 | 11/1988 | Mears et al. | 65/3.12 |

OTHER PUBLICATIONS

"High-Gain Erbium-Doped Traveling Wave", by Desurvire et al., Optics Letters, vol. 12, No. 11, Nov. 1987.
Koester et al., Applied Optics, vol. 3, No. 10, Oct. 1964, "Amplification in a Fiber Laser", pp. 1182-1186.
Mollenauer et al., IEEE Journal of Quantum Elec., vol. QE-22, No. 1, Jan. 1986, "Soliton Propagation in Long Fibers with . . . ", pp. 157-173.
Poole et al., J. of Lightwave Tech., vol. LT-4, No. 7, Jul. 1986, "Fabrication and Characterization of Low-Loss . . . ", pp. 870-876.
Desurvire et al., Optics Letters, vol. 12, No. 11, Nov. 1987, "High-Gain Erbium-Doped Traveling-Wave . . . ", pp. 888-890.

*Primary Examiner*—Akm Ullah
*Attorney, Agent, or Firm*—Gregory C. Ranieri

[57] ABSTRACT

Bidirectional lightwave transmission is restored and uniform amplification of lightwave signals over long spans of optical fiber is achieved by employing distributed amplification over the spans. Distributed amplification is achieved with an amplifying optical fiber which includes a long length of optical fiber having a dilute rare-earth dopant concentration substantially in the fiber core region, and a corresponding pump signal generator at at least one end of the doped fiber having the appropriate wavelength and power to cause amplification of optical signals by both Raman effects and stimulated emission from the rare-earth dopants. Dilute concentrations are understood as the range of concentrations substantially satisfying the condition that the gain from the rare-earth dopant, when near saturation, is substantially equal to the fiber loss.

17 Claims, 3 Drawing Sheets

DISTRIBUTED AMPLIFICATION FOR LIGHTWAVE TRANSMISSION SYSTEM

TECHNICAL FIELD

This invention relates to lightwave transmission systems and, more particularly, to those systems which include optical amplifiers.

BACKGROUND OF THE INVENTION

Cost of long distance lightwave communication systems, whether terrestrial or undersea, is closely related to the unrepeatered distance spanned by the optical fiber transmission medium. As the distance increases, the relative cost of a system generally decreases with respect to cost of installation and cost of maintenance.

Actual and proposed long distance lightwave communication systems described in the literature strive for long unrepeatered links of optical fiber by employing lumped amplifiers at the end of each fiber span. Each discrete amplifier linearly boosts the optical signal power supplied to the next span of fiber as shown in FIG. 1 in much the same manner as conventional electronic amplifiers for analog coaxial-cable systems. See *Optical Fiber Telecommunications II*, edited by S. E. Miller et al., pp. 819-22 (Academic Press:1988). Optical isolators are generally employed with each amplifier to avoid feedback effects. Since isolators are unidirectional devices, the resulting lightwave system is also unidirectional.

Optical amplification has been achieved by both semiconductor amplifiers and fiber amplifiers. Semiconductor amplifiers utilize stimulated emission from injected carriers to provide gain whereas fiber amplifiers provide gain by stimulated Raman or Brillouin scattering or fiber dopants such as molecular $D_2$ or $Er^{3+}$.

While these amplifiers are simpler, less expensive alternatives to regenerative optoelectronic repeaters, it cannot be overlooked that their use adds noise which accumulates from one amplification section to the next. In response to this problem, distributed amplification systems employing stimulated Raman scattering and stimulated Brillouin scattering were observed as alleviating the problem. However, it has been determined that such methods for achieving distributed amplification on a substantially uniform basis are limited for reasonable pump powers on bidirectionally pumped fibers to fiber lengths on the order of 50 km. This can be understood from the fact that the pump power decays exponentially according to the loss coefficient of the optical fiber at the pump wavelength.

At the present time, most telecommunication system designers specify a required optical fiber span between amplifiers of 100 km. or more. To achieve transmission over such long spans with cascaded discrete amplifier stages, it is possible to increase the optical signal power launched into the fiber at the transmitter to overcome the intrinsic loss of the longer fiber. However, such an approach causes significant signal intensity variations in the transmission fiber which lead to serious problems with nonlinear effects in the fiber itself and, possibly, to problems with saturation of the signal amplifiers.

SUMMARY OF THE INVENTION

Bidirectional lightwave transmission is restored and uniform amplification of lightwave signals over long spans of optical fiber is achieved by employing distributed amplification over the spans. Distributed amplification is achieved with an amplifying optical fiber which includes a long length of optical fiber having a dilute rare-earth dopant concentration substantially in the fiber core region, and a corresponding pump signal generator at at least one end of the doped fiber having the appropriate wavelength and power to cause amplification of optical signals by both Raman effects and stimulated emission from the rare-earth dopants. Dilute concentrations are understood as the range of concentrations substantially satisfying the condition that the gain from the rare-earth dopant, when near saturation, is substantially equal to the fiber loss.

While distributed amplification is realized in one embodiment over one homogeneous span of optical fiber, other embodiments are shown in which distributed amplification is achieved using heterogenous combinations of doped and undoped fibers within the same span for range extension without increasing the number of pump signal generators. That is, longer distances can be spanned with the doped/undoped fiber distributed amplification combinations than with the single doped amplifying fiber. In the latter embodiments, it is also shown that doped fibers included in a single span comprise, if desired, segments of different dilute doping concentrations.

Preferred embodiments for the rare-earth doped optical fibers are described using $Er^{3+}$ ions.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

System designs for future long distance lightwave communication systems are presently specifying relatively long fiber spans of approximately 100 km. between system elements on the link such as repeaters or regenerators or pump lasers or the like. In such an environment, the present invention provides an artificially lossless substitute for the long optical fiber span without a need for repeaters or regenerators at the end of each span. While such long spans are described in the context of the exemplary embodiments below, it should be understood by those skilled in the art that shorter spans (1 km.≤L≤100 km.) and even longer spans (L≧100 km.) are achievable with the present invention.

Figure 1:
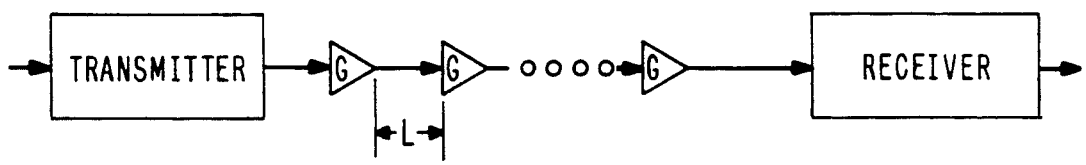
FIG. 1 shows a simplified block diagram of a prior art long distance, lightwave communication system employing discrete optical amplifiers after each span of optical fiber.
Figure 2:
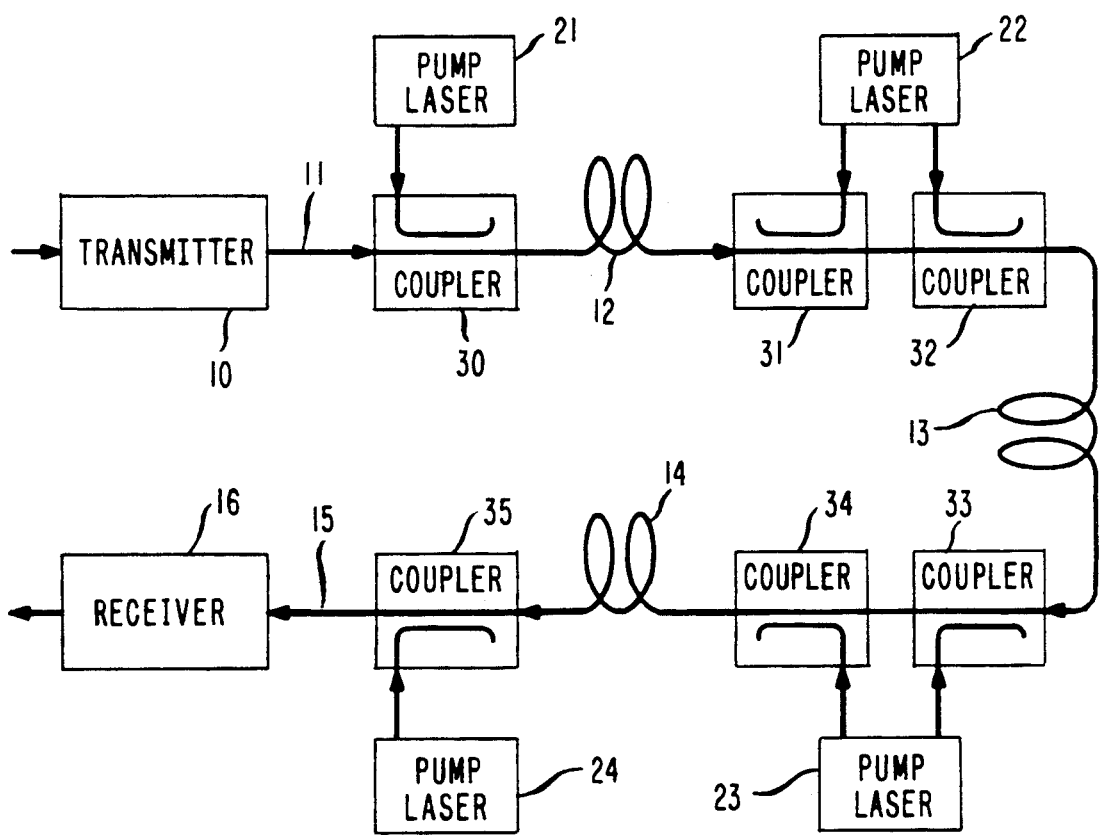
FIG. 2 shows an exemplary multiple span, long distance, lightwave communication system employing distributed amplification in accordance with the principles of the invention.

An exemplary lightwave communication system is shown in FIG. 2 in which three links of distributed amplifying fiber substantially cover the long distance between transmitter 10 and receiver 16. While only three links of amplifying fiber have been depicted in the FIG., it is understood by those skilled in the art that the number of links can assume any value between 1 and N, where N is a large integer. Transmitter 10 is shown coupled optically to the first link by transmission medium 11 which may be realized by optical fiber or an air gap or some suitable waveguide device for lightwave signals. In a similar manner, receiver 16 is shown coupled optically to the third link by transmission medium 15 which may be realized by optical fiber or an air gap or some suitable waveguide device for lightwave signals. Each link shown in FIG. 2 comprises pump lasers optically coupled through an appropriate coupling element to each end of a span of optical amplifying fiber for pumping the entire span and, thereby, achieving gain sufficient to counteract at a minimum the intrinsic loss of the fiber.

Figure 5:
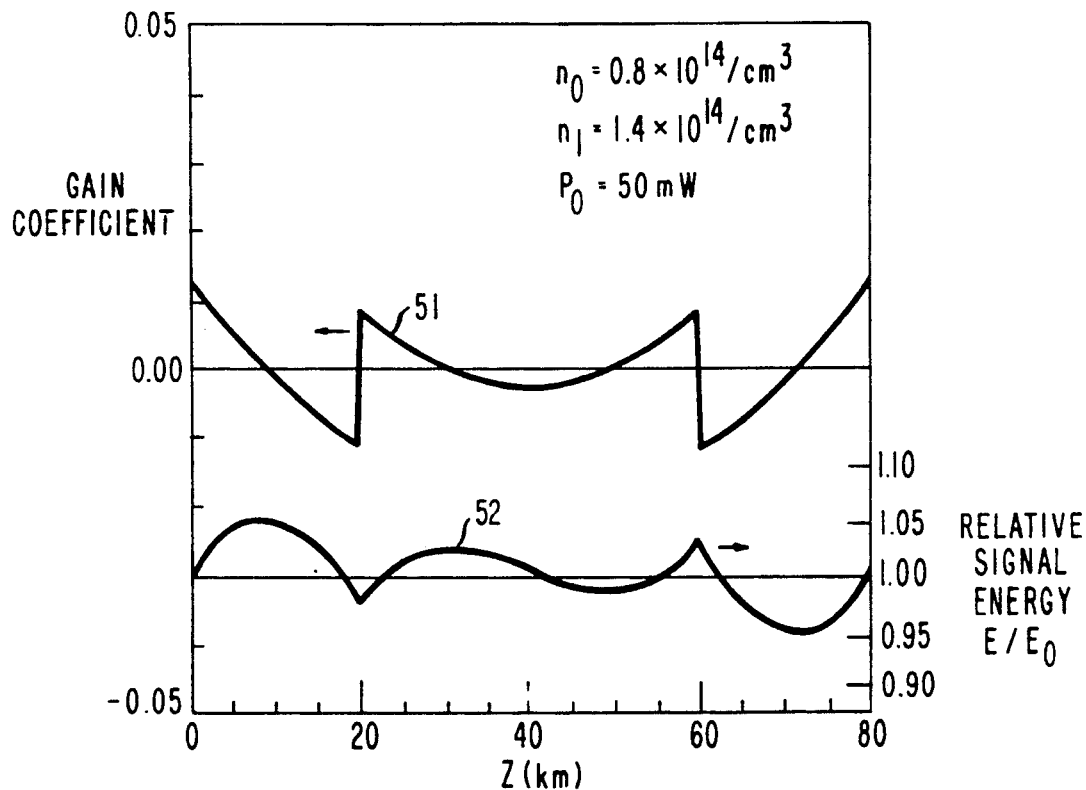
FIG. 5 shows plots of gain coefficient and relative energy versus distance along the amplifying fiber from FIG. 6.

The first link comprises a span of amplifying fiber 12 to which both pump laser 21 is optically coupled through coupler 30 for co-directional pumping of the transmitted lightwave signal and pump laser 22 is optically coupled through coupler 31 for contra-directional pumping of the transmitted lightwave signal. The second link comprises a span of amplifying fiber 13 to which both pump laser 22 is optically coupled through coupler 32 for co-directional pumping of the transmitted lightwave signal and pump laser 23 is optically coupled through coupler 33 for contra-directional pumping of the transmitted lightwave signal. The third link comprises a span of amplifying fiber 14 to which both pump laser 23 is optically coupled through coupler 34 for co-directional pumping of the transmitted lightwave signal and pump laser 24 is optically coupled through coupler 35 for contra-directional pumping of the transmitted lightwave signal. In this embodiment, a single pump laser such as laser 22, which is located at the connection of two links, provides co-directional pumping for one link and contra-directional pumping for the other link in a manner similar to that shown in U.S. Pat. No. 4,699,452 (FIG. 5). It is contemplated that separate pump lasers may be employed for providing pumping to one link or the other, but not both, in order to better segregate components of a particular link. The latter pumping arrangement is shown in U.S. Pat. No. 4,699,452 (FIG. 6) and in an article by L. F. Mollenauer et al., *IEEE Journal of Quantum Electronics*, Vol. QE-22, No. 1, page 157, (1986).

Pump lasers 21, 22, 23, and 24 are selected to operate in a continuous wave (CW) or quasi-continuous wave (quasi-CW) mode at a wavelength for achieving amplification at the wavelength of the transmitted lightwave signal in the sequence of spans of amplifying fiber. Amplifying fibers dilutely doped with erbium ($Er^{3+}$), for example, require a pump signal in the wavelength range 1.46 $\mu$m to 1.48 $\mu$m to cause amplification of a transmitted lightwave signal in the wavelength range 1.53 $\mu$m to 1.58 $\mu$m. It should be noted that additional amplification in the amplifying fiber via the Raman effect is also possible when the wavelength separation between the pump signal and transmitted lightwave signal is judiciously selected. For fused silica fibers, significant Raman amplification is achieved over a relatively broad band of frequencies centered about a frequency approximately 450 $cm^{-1}$ below the pump frequency when sufficient pump power (30 mW to 100 mW) is applied. It should be noted that the amount of Raman gain achieved is directly proportional to the amount of pump power supplied to the fiber. See, for example, the above-cited article by Mollenauer et al. at page 165 (FIG. 13). As will be described below, modest pump laser power such as that available from semiconductor lasers is sufficient to achieve Raman gain and gain via stimulation of the fiber dopant ions.

Couplers 30, 31, 32, 33, 34, and 35 are shown as standard directional couplers well known to those skilled in the art. In a preferred embodiment, wavelength dependent directional couplers are employed to provide excellent cross-coupling of the pump signal while simultaneously providing excellent straight-through coupling of the amplified transmitted lightwave signal. Both types of couplers provide a means for coupling the optical power from each corresponding pump laser to the waveguide and fiber over which the transmitted lightwave signal is propagating while simultaneously allowing the transmitted lightwave signals to proceed substantially unimpeded from fiber 11 to fiber 12, from fiber 12 to fiber 13, and so on. These couplers are realizable in fiber, semiconductor and dielectric waveguide (e.g., lithium niobate) devices. Also, optical elements such as dichroic mirrors may be utilized for optical coupling.

Amplifying fibers 12, 13, and 14 provide the medium for distributed amplification of the transmitted lightwave signal via gain from stimulation of the dopant ions in the fiber and, possibly, via gain from the Raman effect. These fibers are at least 1 km and, generally, are ten or several tens of kilometers long. Rare earth dopants such as erbium, holmium, neodymium and the like are contemplated for incorporation primarily in the core region of the fiber. By locating the dopant ions centrally in the core region of the fiber, it is possible to achieve a maximum level of saturation for a given pump power because interaction between the dopant ions and the optical fields for the lightwave signals is substantially optimized. Fused silica fibers are preferred because their transmission characteristics are well suited to lightwave signal propagation around 1.5 $\mu$m. In order to achieve improved transmission performance over the system, it may be desirable to utilize dispersion shifted fibers or single polarization fibers (e.g., polarization maintaining fibers or polarization preserving fibers) as the foundation for the amplifying fiber. Fabrication techniques for making such doped fibers are known to those skilled in the art and are discussed in U.S. Pat. No. 4,787,927 whose teachings are expressly incorporated herein by reference.

Rare earth dopants in fibers such as silica-based optical fibers are easily pumped to saturation. By saturation, it is meant that most of the dopant ions are in an optically excited state. Gain derived from the saturated rare earth dopants is substantially less dependent on the applied pump power than in a system using pure Raman gain. It has been found experimentally by simulation that a large fraction of the dopant ions in the distributed amplifying fiber such as fiber 12 remains in an excited state over a wide variation of pump power. For example, a fifty percent decrease in pump power resulted in only a five percentage point drop in the excited state dopants. Another fifty percent drop in pump signal power resulted in an additional ten percentage point drop for excited state dopants. For these cases, the concentration of rare earth dopant in the fiber is dilute. That is, the concentration of dopant ions per unit volume is sufficient to produce a gain, when the dopant ions are near saturation, which is substantially equal in magnitude to the loss of the optical fiber. For erbium-doped, silica-based fibers exhibiting an intrinsic loss of approximately 0.2 dB/km, a dilute doping concentration has been estimated to be on the order of $10^{14}$ cm$^{-3}$. Such a dilute concentration is equivalently expressed in terms of several parts per billion. These dilute concentrations are in stark contrast to those presently used in short fiber amplifiers wherein doping concentrations on the order of $10^{18}$ cm$^{-3}$ are commonly employed.

Figure 3:
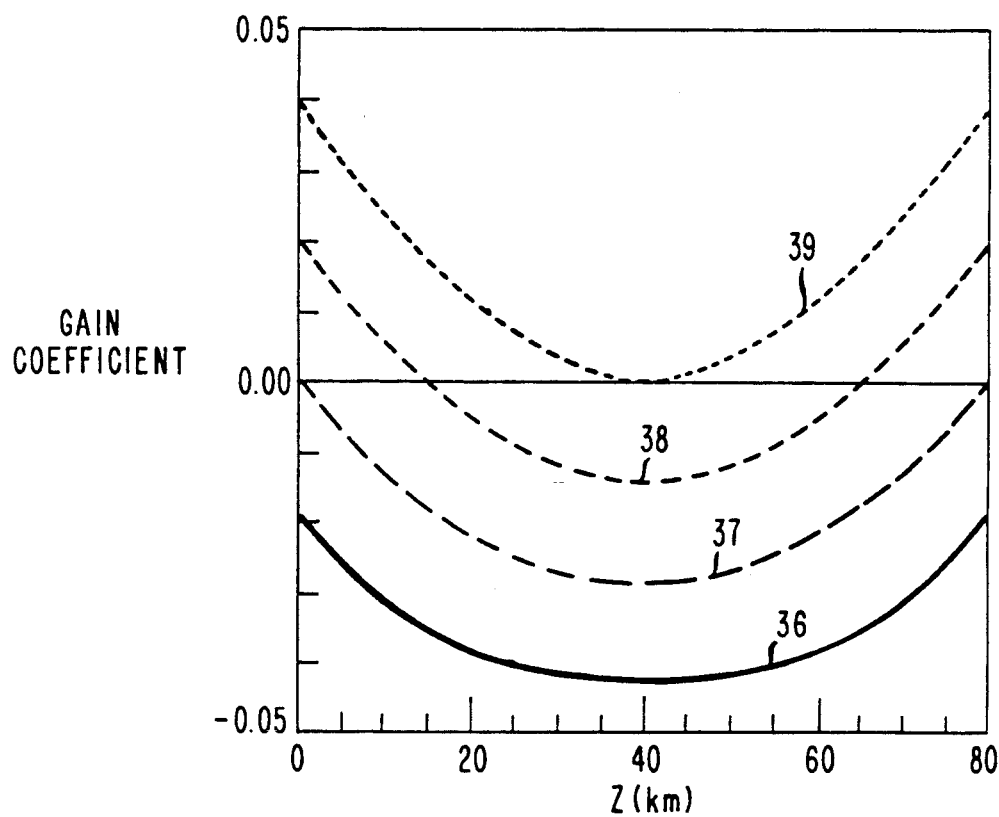
FIG. 3 shows a plot of the gain coefficient versus distance along the fiber for undoped and dilutely doped silica glass fiber.

In order to appreciate the benefits derived from the use of pumped spans of the amplifying fiber, it is best to focus attention on the operation of a single bidirectionally pumped link of distributed amplification using undoped fibers (Raman amplification alone) and rare-earth doped fibers (gain from stimulated emission plus Raman amplification). FIG. 3 shows a plot of the gain coefficient for doped and undoped fibers given a constant level of pump signal power and, in the case of the doped fibers, a constant substantially uniform doping profile. As shown in FIG. 3, the optical fibers are selected to have a length of 80 km. and the pump signal power level is fixed at approximately 50 mW. Doping of the fibers is accomplished with the rare earth dopant, $Er^{3+}$, at different concentrations for the fibers whose characteristics are shown in curves 37, 38 and 39. The doping concentrations are as follows: $0.5 \times 10^{14}$ cm$^{-3}$ for curve 37; $1.0 \times 10^{14}$ cm$^{-3}$ for curve 38; and $1.5 \times 10^{14}$ cm$^{-3}$ for curve 39. Curve 36 shows the characteristic for an undoped fiber. From a study of these curves, it is clear that the gain from the distributed erbium ions permits substantially uniform cancellation of the intrinsic loss of the fiber over the 80 km. link with a relatively low pump signal power injected into each end of the fiber. Substantially perfect cancellation is achieved with a coping concentration of $1.07 \times 10^{14}$ cm$^{-3}$. This result is better understood by integrating the curves in FIG. 3 as shown in FIG. 4.

Figure 4:
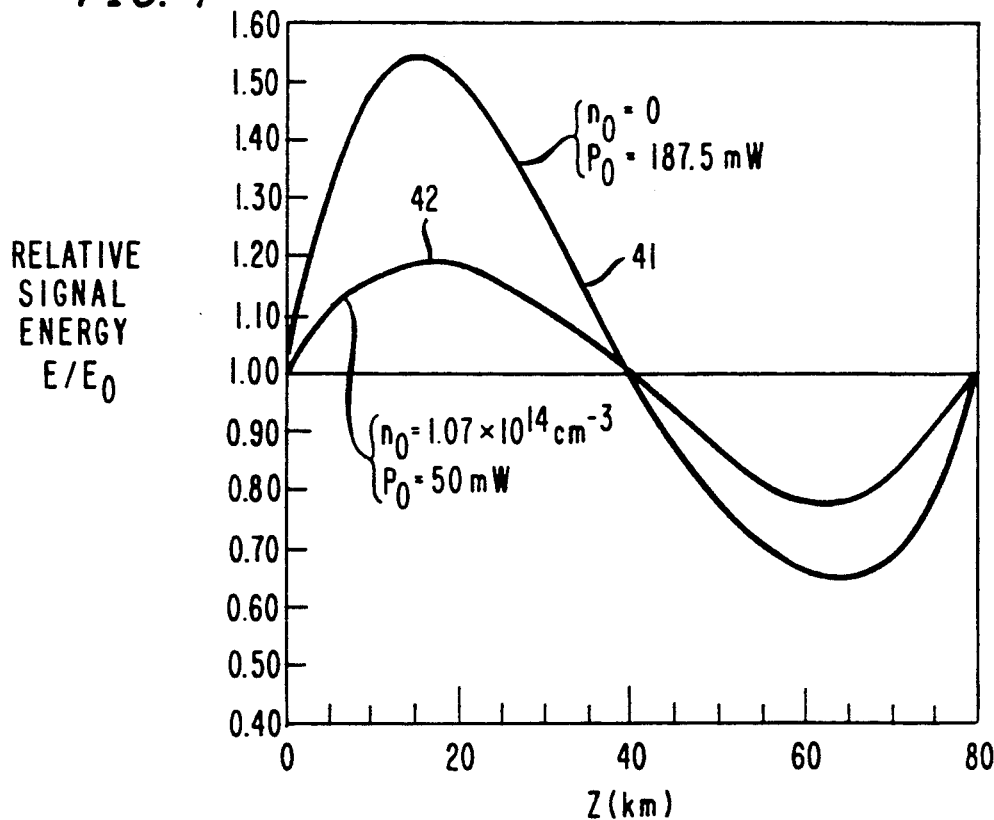
FIG. 4 shows a comparison for the relative energy versus distance along the fiber for undoped and dilutely doped silica glass fibers.

FIG. 4 shows a comparison of relative signal energy versus distance along an optical fiber for undoped (curve 41) and doped (curve 42) fibers. The fibers chosen were 80 km. in length and were pumped at each end. From a comparison of the curves, it is clear that the dilutely doped fiber requires significantly less pump power for operation than the companion undoped fiber. Specifically, the pump power required for the dilutely doped fiber is reduced by a factor of 4 from the pump power required for the undoped fiber. Also, it is important to note that the signal level fluctuations for the doped fiber are much lower than those for the undoped fiber. Larger signal level fluctuations give rise to increased and potentially deleterious nonlinear effects in the fiber. By employing the novel amplifying fiber in transmission links, it is possible to provide sufficient distributed amplification of lightwave signals to effectively compensate the intrinsic loss of the fiber over the entire link while containing the concomitant signal level fluctuations to a low level.

In the embodiments described above, it has been understood that the doping concentration has been dilute and uniform over the entire length of the optical fiber. While this embodiment may be the simplest to achieve in practice, it is contemplated that more complex doping concentrations such as linear grading of the doping concentration along the length of the fiber would also be advantageous. It is also contemplated that sections of doped and undoped fiber can be interconnected to approximate, in a stepwise fashion, a particular grading function such as linear or parabolic.

Figure 6:
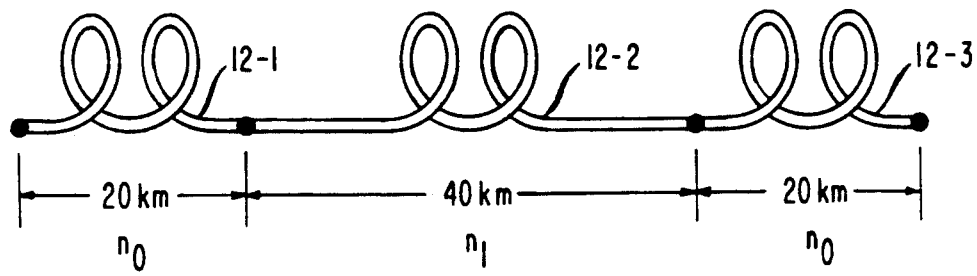
FIG. 6 shows a simplified schematic diagram of a multiple section amplifying optical fiber in accordance with the principles of the invention.

One such example of approximated grading of the fiber doping concentration is realized by connecting a section of dilutely doped fiber (section 12-1; 20 km. long, doping density $n_0$) to a section of less dilutely doped fiber (section 12-2; 40 km long, doping density $n_1 > n_0$) and then by connecting the latter section to a final section of more dilutely doped fiber (section 12-3; 20 km. long, doping density $n_0$) has shown in FIG. 6. The gain coefficient (curve 51) and relative signal energy (curve 52) versus the fiber length is depicted in FIG. 5 for the fiber shown in FIG. 6. It is assumed that the fiber combination shown in FIG. 6 could be substituted for any span of fiber such as fiber 12 in FIG. 2. For the characteristics shown in FIG. 5, it is assumed that the multi-section fiber is pumped from each end by a nominal 50 mW pump source. It should be noted that signal level fluctuations along the length of the fiber are lower than fluctuations in the uniformly doped fiber (FIG. 4) given the same level of pump signal power.

It may be desirable to extend the fiber shown in FIG. 6 over a longer distance by adding, for example, lengths of undoped fiber to each end of the combination shown in FIG. 6. In this configuration, the undoped fiber would produce pure Raman gain while the doped fiber combination would operate as depicted in FIG. 5.

While fiber spans have been shown for approximately 80 km. from pump source to pump source, it is understood that this invention is applicable to much longer distances with the appropriate combination of diluteness for the fiber doping concentration and pump signal power for the distance being spanned. It is contemplated that the total distance spanned by one fiber or combinations of fiber sections is greater than 1 km.

It should be noted that the spontaneous emission noise power from the distributed amplifying fiber system realized in accordance with the principles set forth above is significantly less than the spontaneous emission noise power from a chain of lumped or discrete amplifiers spanning the same distance. The ratio for the noise powers is given as:

$$\frac{P_{spont,\ lump}}{P_{spont,\ distrib}} = \frac{G_s - 1}{\ln G_s},$$

where $G_s$ is the stage gain for a lumped amplifier. For a lumped amplifier separation of 100 km. and a standard fiber loss rate of 0.21 dB/km, it can be shown that the required stage gain is approximately 21 dB. Thus, the spontaneous emission noise in the lumped system is 26 times greater than that in the distributed system realized in accordance with the principles above. As a result, in a long-haul transmission system ($\approx 7500$ km) having a high transmission rate ($\geq 2.5$ Gbps) and an expected error rate of $10^{-9}$, the received signal power for the lumped amplifier system must be 26 times greater than the received signal power in the distributed system. This higher signal power leads to serious problems with fiber nonlinearities and possibly with saturation effects in the discrete amplifiers.

I claim:

1. An optical system for amplifying a first lightwave signal at a first wavelength, said system comprising, an optical fiber having first and second ends, said optical fiber including a dilute concentration of rare-earth dopant ions, said optical fiber having a length greater than 1 km, a source of a first pump signal at a second wavelength for exciting the state of said dopant ions to cause stimulated emission therefrom at said first wavelength, and means for optically coupling said first pump signal into the first end of said optical fiber.

2. The optical system defined in claim 1 wherein said concentration of dopant ions is substantially uniform over the length of said optical fiber.

3. An optical system as defined in claim 2 wherein said rare-earth dopant ions includes $Er^{3+}$.

4. The optical system defined in claim 2 further comprising a source of a second pump signal at said second wavelength for exciting the state of said dopant ions to cause stimulated emission therefrom, and means for optically coupling said second pump signal into the second end of said optical fiber.

5. An optical system as defined in claim 4 wherein said rare-earth dopant ions includes $Er^{3+}$.

6. The optical system defined in claim 1 wherein said concentration of dopant ions increases in a substantially linear manner over the length of said optical fiber from said first end toward said second end.

7. An optical system as defined in claim 6 wherein said rare-earth dopant ions includes $Er^{3+}$.

8. An optical system for amplifying a first lightwave signal at a first wavelength, said system comprising, an optical fiber having first and second ends, said optical fiber including first, second, and third sections connected in sequence wherein said first and third sections are substantially undoped, and said second section includes a dilute concentration of rare-earth dopant ions, said second section optical fiber having a length greater than 1 km, a source of a first pump signal at a second wavelength for exciting the state of said dopant ions to cause stimulated emission therefrom at said first wavelength, and means for optically coupling said first pump signal into the first end of said optical fiber.

9. The optical system defined in claim 8 wherein said concentration of dopant ions is substantially uniform over the length of said optical fiber.

10. An optical system as defined in claim 9 wherein said rare-earth dopant ions includes $Er^{3+}$.

11. The optical system defined in claim 9 further comprising a source of a second pump signal at said second wavelength for exciting the state of said dopant ions to cause stimulated emission therefrom, and means for optically coupling said second pump signal into the second end of said optical fiber.

12. An optical system as defined in claim 11 wherein said rare-earth dopant ions includes $Er^{3+}$.

13. An optical system for amplifying a first lightwave signal at a first wavelength, said system comprising, an optical fiber having first and second ends, said optical fiber including first, second, and third sections connected in sequence wherein said first section includes a first dilute concentration, $n_0$, of rare-earth dopant ions, said second section includes a second dilute concentration, $n_1$, of rare-earth dopant ions, said third section includes a third dilute concentration, $n_2$, of rare-earth dopant ions, said optical fiber having a length greater than 1 km, said dopant ion concentrations being related as $n_0 < n_1$ and $n_2 < n_1$, a source of a first pump signal at a second wavelength for exciting the state of said dopant ions to cause stimulated emission therefrom at said first wavelength, a source of a second pump signal at said second wavelength for exciting the state of said dopant ions to cause stimulated emission therefrom at said first wavelength, means for optically coupling said first pump signal into the first end of said optical fiber, and means for optically coupling said second pump signal into the second end of said optical fiber.

14. The optical system defined in claim 13 wherein said concentration of dopant ions is substantially uniform over the length of each section of said optical fiber.

15. An optical system as defined in claim 14 wherein said rare-earth dopant ions includes $Er^{3+}$.

16. The optical system defined in claim 13 wherein said dopant concentrations are further related as $n_0$ is substantially equal to $n_2$.

17. An optical system as defined in claim 16 wherein said rare-earth dopant ions includes $Er^{3+}$.

* * * * *